_United States Patent_ [19]

Auxier et al.

[11] 3,805,070

[45] Apr. 16, 1974

[54] DETERMINATION OF RADON IN AIR

[75] Inventors: John A. Auxier; Phillip T. Perdue, both of Oak Ridge; William H. Shinpaugh, Knoxville; John H. Thorngate, Oak Ridge, all of Tenn.

[73] Assignee: The United States of America as represented by the United States Atomic Energy Commission, Washington, D.C.

[22] Filed: July 6, 1973

[21] Appl. No.: 377,155

[52] U.S. Cl. ............................. 250/328, 250/370
[51] Int. Cl. .............................................. G01t 1/24
[58] Field of Search .......... 250/328, 336, 364, 366, 250/370, 371, 374, 379, 380, 381, 432, 472, 473, 304

[56] References Cited
UNITED STATES PATENTS
3,663,818  5/1972  Guery ................................ 250/328

_Primary Examiner_—James W. Lawrence
_Assistant Examiner_—Davis L. Willis
_Attorney, Agent, or Firm_—John A. Horan; David S. Zachry; L. M. Deckelmann

[57] ABSTRACT

This invention relates to a device and method for measuring the amount of radon present in the air. A silicon diode detector system operates in helium at atmospheric pressure, and an alpha spectra is obtained that can be analyzed for the radon activity. The invention facilitates radon concentration measurements in the many widely scattered localities in the biosphere where these measurements are of interest, such as in uranium mines, coal mines, and in the lower atmosphere.

7 Claims, 8 Drawing Figures

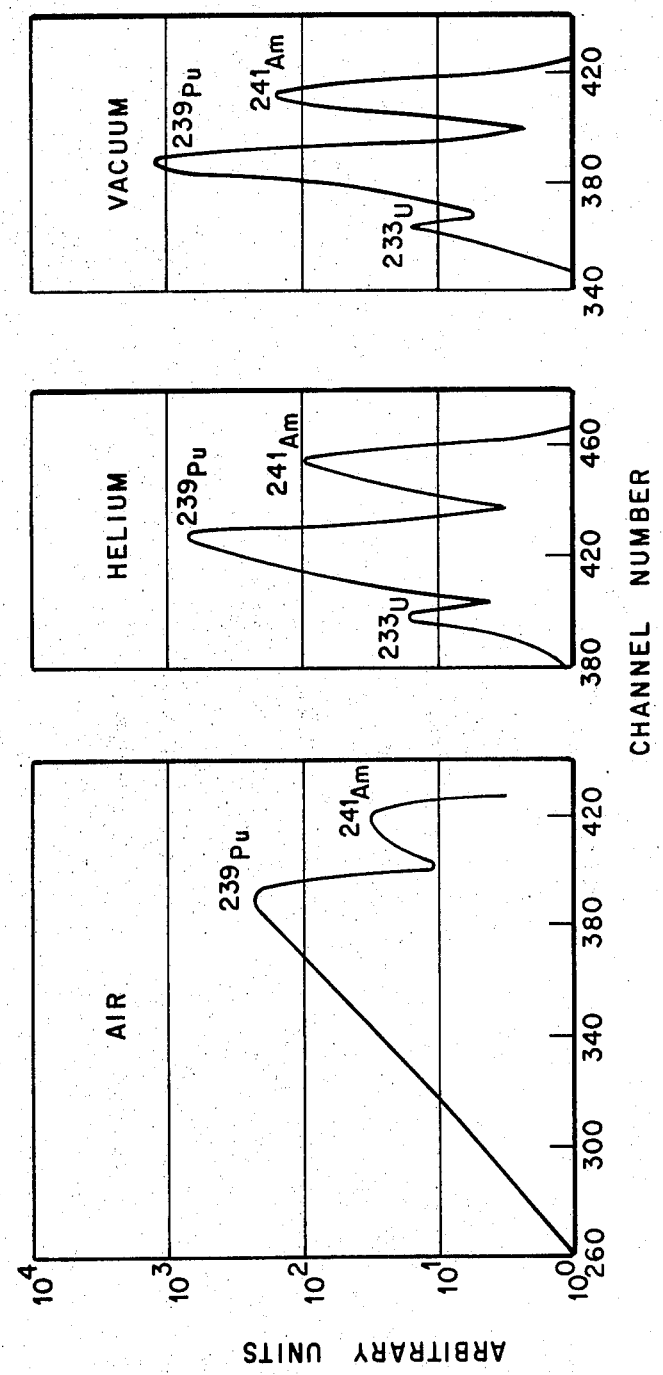

DETERMINATION OF RADON IN AIR

BACKGROUND OF THE INVENTION

This invention was made in the course of, or under, a contract with the United States Atomic Energy Commission.

Radon (Rn) is widely distributed in the biosphere, usually existing in the highest concentrations near ground and in the vicinity of minerals containing uranium. It is chemically inert, exists in gaseous form, has little tendency to react with other elements and is a biological hazard in itself. Radon is, however, one of the elements produced by chains of nuclear transformations and all of its progeny are highly radioactive. The progeny of interest all have short half-lives and decay by the emission of energetic alpha particles to other radioactive daughter products. The chief hazard of high concentrations of radon in the air comes mainly from the short half-life progeny that become attached to dust particles and are efficiently retained in the respiratory system, producing large radiation doses by the emission of other alpha particles in subsequent disintegrations of the radioactive chain.

Greater concentrations of the most important radon isotope—mass number 222—occur naturally because it is the longest lived radon isotope. However, this isotope's first daughter product $^{218}$Po, has a half-life of only 3.05 minutes. This implies that a membrane filter used to collect radon progeny attached to dust particles must be counted immediately because the $^{218}$Po will have essentially decayed after seven half lives, or about 20 minutes.

It is customary in alpha counting to record the spectra in a vacuum rather than in air because the alpha particles suffer an energy loss through collisions with the air molecules. In the case of radon progeny, the broadening of the $^{218}$Po and $^{214}$Pb peaks by air is so great as to totally obscure the $^{218}$Po peak. Another preferred practice is the use of the silicon surface-barrier diode for the alpha detector because of its high (20 KeV) resolution. The use of a silicon diode and a vacuum counting chamber is quite satisfactory when the nuclide being studied has a long half-life or can be produced and counted in the same vacuum chamber. However, it is not a useful means of counting air samples containing short lived emitters. There are numerous problems which prevent applying silicon diode and vacuum counting to the measurement of the $^{218}$Po and $^{214}$Pb peaks. For example, an elaborate counter chamber must be used that has an air lock for admitting the samples to be counted which is a time-consuming operation. If the counting chamber must be cycled from vacuum to atmospheric pressure, a second time-consuming problem is encountered, because most manufacturers of semiconductor detectors stipulate that the diodes should not be operated under bias in the pressure region around 0.1 Torr since breakdown can occur. Thus, the detector bias voltage must also be cycled. Loss of gaseous emitters adsorbed on the air sample when the pressure is reduced is an additional problem.

Thus, there exists a need for an alpha counter that can achieve rapid counting of short-lived radon progeny in an efficient manner and that can avoid the problems of measurement in a vacuum. The present invention was conceived to meet this need in a manner to be described hereinbelow.

SUMMARY OF THE INVENTION

It is the object of the present invention to provide a device and method for measuring radon progeny that avoids the problems of measurement in a vacuum and obtains sufficient resolution within the decay time of the $^{218}$Po to afford a measurement of the radon in the air.

The above object has been accomplished in the present invention by operating a silicon diode counting system in helium at atmospheric pressure with the collected air sample placed a minimum distance from the detector and analyzing the alpha spectra according to known decay relationships to obtain the original radon concentration of the sampled air. The use of helium at atmospheric pressure rather than use of a vacuum has reduced the cost and complication of counting in vacuum with the associated problems in removing the detector bias voltage and later reapplying it at the required calibration point.

BRIEF DESCRIPTION OF THE DRAWINGS

FIGS. 3a, 3b, and 3c are graphs of the measurements of a $^{239}$Pu source made in vacuum, air, and helium for comparison purposes.

DESCRIPTION OF THE PREFERRED EMBODIMENT

Figure 1:
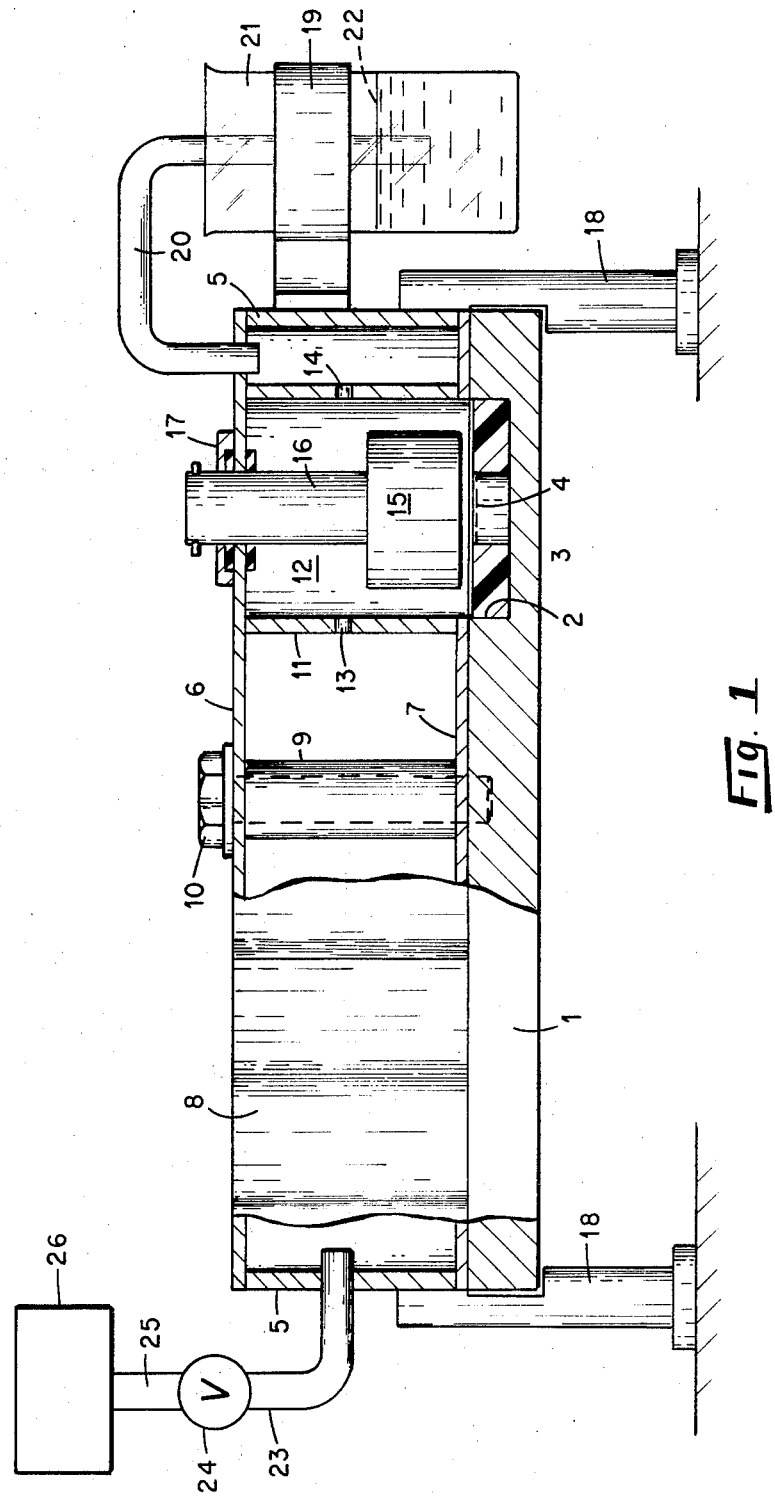
FIG. 1 is a part sectional view of the counter of the present invention.
Figure 2:
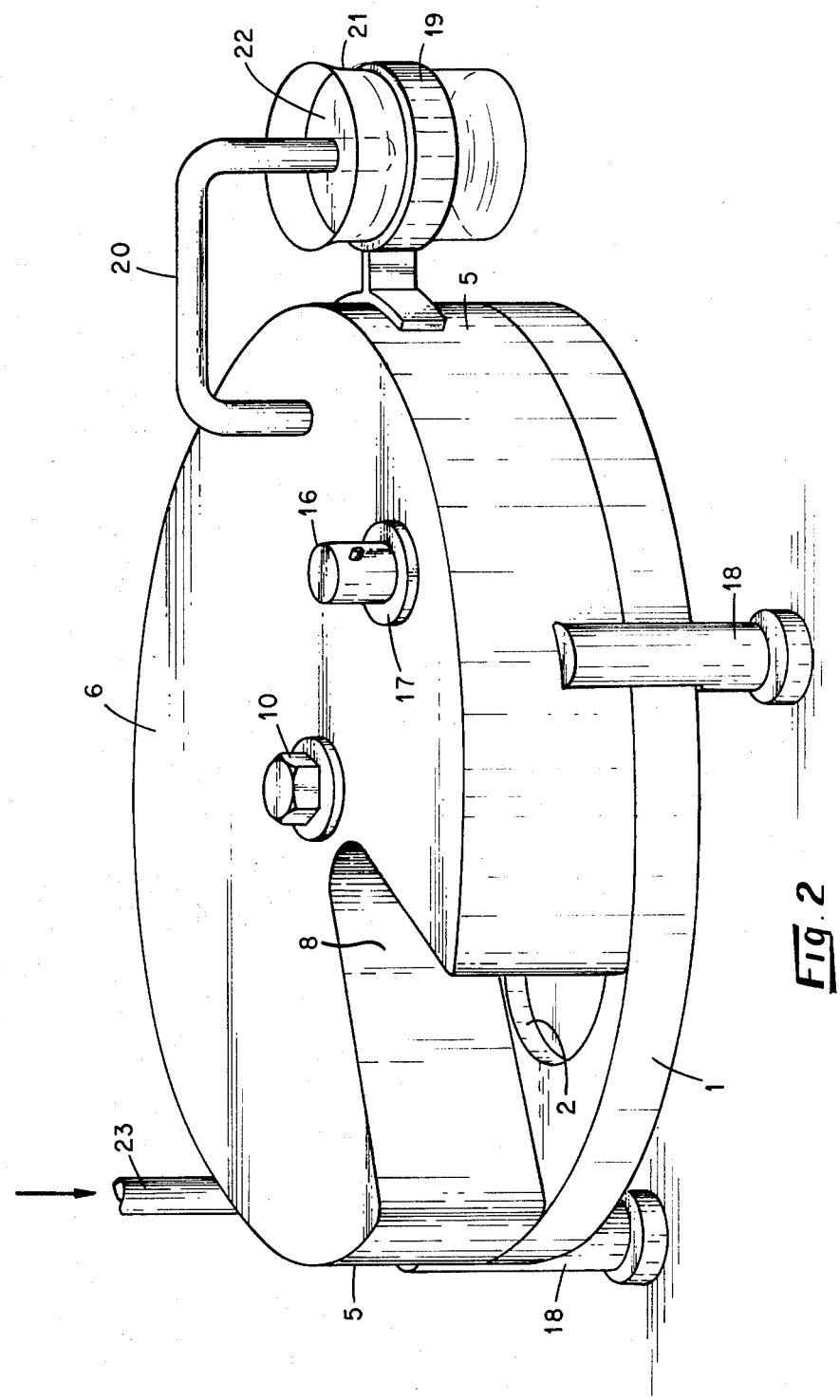
FIG. 2 is an isometric illustration of the counter of FIG. 1.

FIGS. 1 and 2 illustrate the counter of the present invention which is adapted to count the alpha spectra from a sample air filter with the counting being done in helium at atmospheric pressure. In these figures, a generally circular tank is provided with a side wall 5, a top wall 6, and a bottom wall 7. This tank is provided with a generally V-shaped closed slot 8, more clearly illustrated in FIG. 2, for exposing one of three circular recessed slots or depressions 2 in a rotatable plate 1 for receiving a sample holder 3 and a sample air filter 4 held thereby (FIG. 1). The slot 8 facilitates the loading or unloading of a respective sample holder with its sample filter into or from each of the slots 2 as the plate 1 is rotated to each of its loading positions.

There are three posts 18 affixed to the tank side wall 5 for supporting the tank. These posts 18 are equally spaced around the tank, only two being shown in FIGS. 1 and 2, and the right hand post 18 in FIG. 1 has been moved from its actual position, as shown in FIG. 2, for the sake of clarity in the drawing. The circular disk 1 containing the recessed depressions 2 is held against the bottom face of the tank wall 7 by means of a bolt 10 passing through the tank top wall 6, a sleeve 9, and the bottom tank wall 7 with the bolt threaded into the disk 1. Thus, the disk 1 is adapted to be rotated about the axis of the bolt 10 by a rotation of this bolt.

The tank 5 is provided with a tubular detector chamber 12 defined by a circular wall 11. The chamber 12 is opened at its bottom and has an internal diameter equal to the diameter of each of the plate depressions 2 in the rotatable plate 1. The chamber wall 11 is provided with apertures 13 and 14 such that helium is adapted to flow through the chamber 12 in a manner to be described. A silicon surface-barrier diode 15 is held in position in the chamber 12 by means of a support post 16 which extends out of the chamber 12 through the upper tank wall 6 and is supported to the wall 6 by means of a support bracket 17. The diode 15 is connected by lead wires, not shown, extending through the support post 16 and being connected to an external conventional readout unit, not shown.

A source of helium 26 is connected by means of a pipe 25, a valve 24, and a pipe 23 to the interior of the tank through the tank wall 5. A helium exit tube 20 is connected through the top tank wall 6 and extends into a glass beaker 21 below the oil 22 contained in the beaker. The beaker 21 is supported by means of a bracket 19 affixed to the tank wall 5. Thus, when the valve 24 is opened, helium is adapted to flow through the tank, through the detector chamber 12 by means of the apertures 13 and 14, and then exit to the atmosphere by bubbling through the oil 22 in the beaker 21.

It should be noted that when a plate 1 depression 2 is in its position, as shown in FIG. 2, either for a loading or unloading of a sample and sample holder, then the next depression 2 (with a sample and sample holder contained therein) is positioned directly underneath the diode detector 15 and the detector chamber 12 for a detection or measurement operation.

The diode detector 15 is provided with a 4 cm² active area, for example, and the distance between the detector and the sample filter 4 is a minimum of about 5.25 mm, for example. This distance cannot be decreased much below 5 mm due to the geometry of the diode. Expectably, the alpha particles undergo some energy loss in the helium between the sample source and the detector. For example, a 6.4 MeV alpha particle will lose about 80 KeV in traversing the 5 mm distance in helium. However, the amount of the loss is not sufficient to obscure the $^{218}$Po peak as happens in an air medium. When air is used instead of helium, then a 6.4 MeV alpha particle will lose about 270 KeV in traversing the same distance, thus obscuring the $^{218}$Po peak.

Measurements of a $^{239}$Pu source made in air, helium, and vacuum are compared in FIGS. 3a, 3b, and 3c. The recorded pulse height distribution is smeared from the peak value to much lower energies due to the finite thickness of the source. Samples collected on a standard paper filter will exhibit poor alpha resolution due to the collected particles being trapped at various depths in the filter. To correct for this problem, a micropore filter of about 0.45 micron diameter pore size is used as the sample collector in the present invention, and such a filter will facilitate the collection of a nearly monomolecular layer of particles. Micropore filters are manufactured by the Gelman Instrument Company, for example, under the trade name Microcel.

The use of helium in the present invention reduces the non-linearity in the energy response of the system caused by the variation of stopping power with energy. If necessary, a $^{228}$Th source can be used to calibrate the energy scale in the region of interest, although the energy of the desired alpha particle is generally known when sampling for particular nuclides. The substitution of helium for vacuum has reduced the cost and complication of counting in vacuum with the associated problems in removing the detector bias voltage and later reapplying it back to its calibration point. One of the principal uses of the present invention has been the measurement of $^{222}$Rn from decay of its daughters. The speed with which samples could be changed, as well as the resolution, made such measurements possible. More recently, the present counter system has been employed to measure thoron ($^{220}$Rn) in thorium processing operations, from its daughters trapped on a membrane air filter. In such an application, the vacuum method is both unduly time-consuming and capable of dislodging the alpha-containing dust particles from the filter.

Figure 4C:
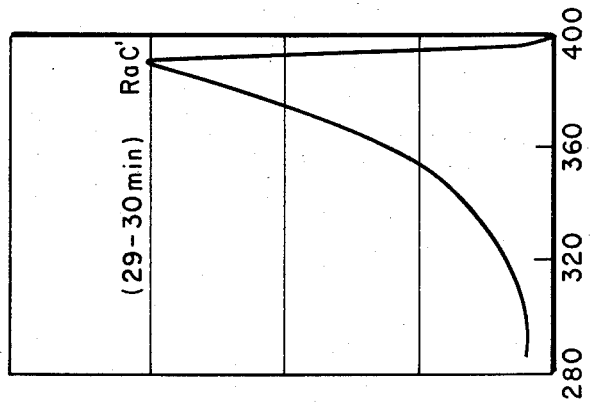
FIGS. 4a, 4b, and 4c are graphs of typical $^{222}$Rn daughter decay spectra from a single air filter at three different times after taking the sample and utilizing the present invention.
Figure 4B:
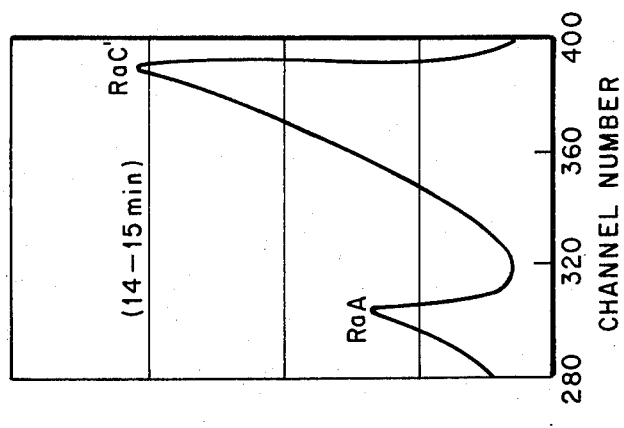
Figure 4A:
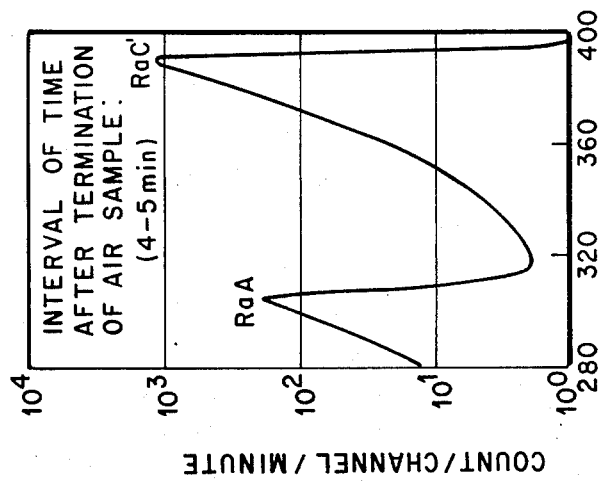

As an example of the response of the present counter, typical $^{222}$Rn daughter decay spectra are shown in the graphs of FIGS. 4a, 4b, and 4c. They are from a single air filter at three different times after taking the sample. Such spectra can be utilized to obtain $^{222}$Rn concentration by the method of Martz et al. as described in an article in *Health Physics* 17, 131 (1969). In a similar manner, $^{220}$Rn (thoron) may be calculated from the daughter decays. The usual spectrum obtained on an air sample is complicated by the presence of $^{222}$Rn daughters. Due to the 10.64 hour half-life of thorium-B ($^{212}$Pb), it is feasible to wait until the radon daughters have decayed before measurements are made. The spectrum may then be calculated to yield $^{220}$Rn concentration, using the method of Duggan as described in an article in *Health Physics* 24, 310 (1973). In the case of multiple alpha emitters, as shown in FIGS. 3a, 3b, and 3c, the spectrum may be summed to obtain total yield. Yields of each isotope may be estimated by plotting and extrapolating the curves, or rigorous computer methods of curve fitting may be employed. In any event, it is not possible to wait until the interfering alpha emitter has decayed and then renormalize the curve.

In the operation of the present invention, the counting of the desired decays can be conventionally performed with two or more single channel analyzers and measuring the relative peak responses using scalers. However, a great deal more information about any dust and water concentration can be observed with a multichannel analyzer. Day-to-day drift in the counting system is no more than two channels, and can be quickly corrected with a $^{239}$Pu source.

The most immediate application of the present invention is to uranium mines, but the method has application in all deep-hole mining operations. The detector also has application in measuring radon from coal, from concrete and block used to build roads and houses, in basements and enclosed areas of houses, factories, schools, etc., built over areas that have unusually large amounts of uranium or thorium in the soil. With the present device, it is also possible to measure radon progeny collected on a filter in outdoor air monitors.

This invention has been described by way of illustration rather than by limitation, and it should be apparent that it is equally applicable in fields other than those described.

What is claimed is:

1. A device for measuring the amount of radon present in the air comprising a detector chamber provided with an open end, an alpha particle detector mounted within said chamber with the face thereof positioned parallel to and adjacent to the open end of said chamber, a movable plate provided with at least one recessed depression therein and mounted flush with said chamber open end, said plate depression being adapted to be positioned in a sample loading position or in a position in axial alignment with said chamber, a sample holder with a sample filter adapted to be placed within said plate depression at its loading position such that the face of said sample filter is at a desired minimum distance from said detector face when said plate depression is positioned in alignment with said chamber, a source of helium, and said detector chamber being coupled by means connected to said helium source and to the atmosphere and communicating therewith such that helium is adapted to flow through said chamber and into the atmosphere during a detection operation, whereby during said operation said detector provides an output for obtaining an alpha spectra in accordance with the decay products from said sample filter thereby permitting a determination of the original radon concentration of the sampled air.

2. The device set forth in claim 1, wherein said means for coupling said detector chamber to said helium source and then to the atmosphere includes a tank encompassing all of said chamber except the open end thereof, said chamber being provided with an entrance aperture and an exit aperture communicating with the interior of said tank, said tank being supported by means of a plurality of vertical posts affixed thereto, a control valve, means for connecting said valve between said helium source and the interior of said tank, a glass beaker containing oil supported on and to the exterior of said tank, and a tube communicating with the interior of said tank and extending within said beaker below the oil level therein, whereby said helium is adapted to flow through said valve, through said tank and detector chamber and then bubble through said beaker oil into the atmosphere during operation of said device.

3. The device set forth in claim 2, wherein said tank is provided with a recessed slot portion for defining said sample loaidng position of said movable plate, whereby said sample holder with its sample filter may be readily placed into or removed from said recessed plate depression when it is in its loading position.

4. The device set forth in claim 3, wherein said movable plate is provided with at least two or more recessed plate depressions for receiving respective additional sample holders with sample filters, said movable plate being generally circular and being held in place flush with the bottom of said tank by means of a bolt extending through the center of said tank and threaded into said plate, whereby said plate is adapted to be rotated about the axis of said bolt by a rotation thereof for the sequential positioning of each of said plate depressions in line with the open end of said detector chamber while at the same time one of the other plate depressions is at its sample loading-unloading position.

5. The device set forth in claim 4, wherein said detector is a silicon surface-barrier diode.

6. The device set forth in claim 5, wherein said sample filter is a micropore filter of about 0.45 micron diameter pore size.

7. The device set forth in claim 6, wherein said detector diode has a sensitive area of 4 $cm^2$, and said minimum distance between the face of said detector and said sample filter during operation of said device is about 5.25 mm.

* * * * *